US012608987B2

(12) United States Patent
Wang

(10) Patent No.: US 12,608,987 B2
(45) Date of Patent: Apr. 21, 2026

(54) MULTI-FACTOR AUTHENTICATION SYSTEM FOR PROPERTY MANAGEMENT

(71) Applicant: Chih-Chun Wang, Delta (CA)

(72) Inventor: Chih-Chun Wang, Delta (CA)

( * ) Notice: Subject to any disclaimer, the term of this patent is extended or adjusted under 35 U.S.C. 154(b) by 0 days.

(21) Appl. No.: 18/801,504

(22) Filed: Aug. 12, 2024

(65) Prior Publication Data

US 2026/0045130 A1 Feb. 12, 2026

(30) Foreign Application Priority Data

May 16, 2024 (TW) ................................ 113118164

(51) Int. Cl.
*G07C 9/27* (2020.01)
*G07C 9/00* (2020.01)
*G07C 9/25* (2020.01)

(52) U.S. Cl.
CPC ..... *G07C 9/00563* (2013.01); *G07C 9/00571* (2013.01); *G07C 9/257* (2020.01); *G07C 9/27* (2020.01); *G07C 2209/02* (2013.01); *G07C 2209/08* (2013.01)

(58) Field of Classification Search
CPC .. G07C 9/00563; G07C 9/00571; G07C 9/27; G07C 2209/02; G07C 2209/08; H04L 63/0861
See application file for complete search history.

(56) References Cited

U.S. PATENT DOCUMENTS

| | | | | |
|---|---|---|---|---|
| 2004/0187018 | A1 | 9/2004 | Owen | |
| 2013/0081119 | A1 | 3/2013 | Sampas | |
| 2020/0036709 | A1* | 1/2020 | Mars | H04L 63/0853 |
| 2022/0230495 | A1* | 7/2022 | Bajaj | G07C 9/00571 |

OTHER PUBLICATIONS

Nabeel Ali Albahbooh et al., A Mobile Phone Device as a Biometrics Authentication Method for an ATM Terminal, 2015 IEEE International Conference on Computer and Information Technology; Ubiquitous Computing and Communications; Dependable, Autonomic and Secure Computing; Pervasive Intelligence and Computing, 2015, pp. 2017-2024, XP032836236 ,2015.

* cited by examiner

*Primary Examiner* — Vernal U Brown
(74) *Attorney, Agent, or Firm* — Winston Hsu

(57) ABSTRACT

A multi-factor authentication system for property management may provide user a convenient and safe property management service via enrolling with service for multi-factor authentication via an application. The user may log in the multi-factor authentication service platform during the enrollment phase via the application to acquire an account and obtain authority for use, thereby to access the service provided by the multi-factor authentication service platform via a property management station system. In addition, during the property management service, the user may acquire the property management service in fewer steps and a more secure manner during an authentication phase with the multi-factor authentication service platform, thereby to enforce security for identity authentication.

9 Claims, 7 Drawing Sheets

MULTI-FACTOR AUTHENTICATION SYSTEM FOR PROPERTY MANAGEMENT

BACKGROUND OF THE INVENTION

1. Field of the Invention

The invention is related to multi-factor authentication technique, especially a multi-factor authentication system for property management.

2. DESCRIPTION OF THE PRIOR ART

Property management is a real estate development service that combines technology and management technology to provide management, maintenance, cleaning, preservation, repair and asset management services for buildings and their surrounding environment, thereby to satisfy user needs and extend life of buildings.

Nowadays, property management services generally rely on access control systems, 24/7 CCTV surveillance systems (such as surveillance cameras in buildings) and security measures (such as guards) to ensure identity of people entering and exiting and the safety of property. For example, an entry/exit personnel may use recognition devices (such as access control card or access control magnetic buckle) to enter and exit authorized building areas. Security personnel may also manage safes storing important assets or confidential documents through a monitoring system and access code.

However, property management services are prone to stealing, theft or copying of passwords or recognition devices, and security personnel are required to monitor the entry and exit of personnel at all entrances and floors in the building around the clock, and assist in providing temporary access for foreign visitors or temporary entry/exit personnel. Therefore, there are problems such as insufficient access control management and increased manpower/material costs.

Therefore, there is an unmet need in the industry to provide a multi-factor authentication system to increase security of asset management and property management, enable additional identity authentication for user and secure private information of the user.

SUMMARY OF THE INVENTION

A multi-factor authentication system for property management may include a user device, a property management station system, and a multi-factor authentication service platform. The user device, the property management station system, and the multi-factor authentication service platform are coupled to each other. The user device may include an application, a first data processing unit and a user device display. The application may be used to process and transmit first biometric data. The first data processing unit may be used to extract and transmit the first biometric data. The user device display may be coupled to the first data processing unit and used to display the first biometric data. The property management station system may include a property management apparatus and a cloud property management station server apparatus. The property management apparatus may be used to receive a first authentication factor and a second authentication factor from a user, process the first authentication factor to generate first-authentication-factor-authentication-successful instruction, and transmit the first-authentication-factor-authentication-successful instruction and the second authentication factor. The cloud property management station server apparatus may be coupled to the user device and the property management apparatus and used to receive and transmit the first biometric data from the user device and process the first-authentication-factor-authentication-successful instruction and the second authentication factor from the property management apparatus. The multi-factor authentication service platform may include a cloud biometric server apparatus coupled to the cloud property management station server apparatus and the user device and may be used to process the first biometric data from the cloud property management station server apparatus, extract biometric feature according to the first biometric data, process second biometric data from a biometric device, authenticate the second biometric data to generate a user-authentication-successful instruction and transmit the biometric feature, the user-authentication-successful instruction and user metadata.

Based on the above, the multi-factor authentication system for property management may not only address concerns for the user property security and identify authentication during exit/entry of personnel for property management, but may also further provide the following improvements and technical effects:

i. the cloud biometric server apparatus of the multi-factor authentication service platform may encode the biometric data (i.e., the biometric data that act as authentication factor, such as, but not limited to, facial image of the user) provided by the user to be unrecognizable for external system, external device and external personnel, such that security for authentication factor of the user may be improved.

ii. the cloud biometric server apparatus of the multi-factor authentication service platform may only extract biometric feature of the biometric data without storing the same. Meaning security for authentication factor of the user may be improved and the restricted data is kept from leaking. Further, the cost for the cloud biometric server apparatus of the multi-factor authentication service platform may be reduced (i.e., the database for storing the biometric feature may be omitted for the cloud biometric server apparatus), and the identity authentication may be sped up.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
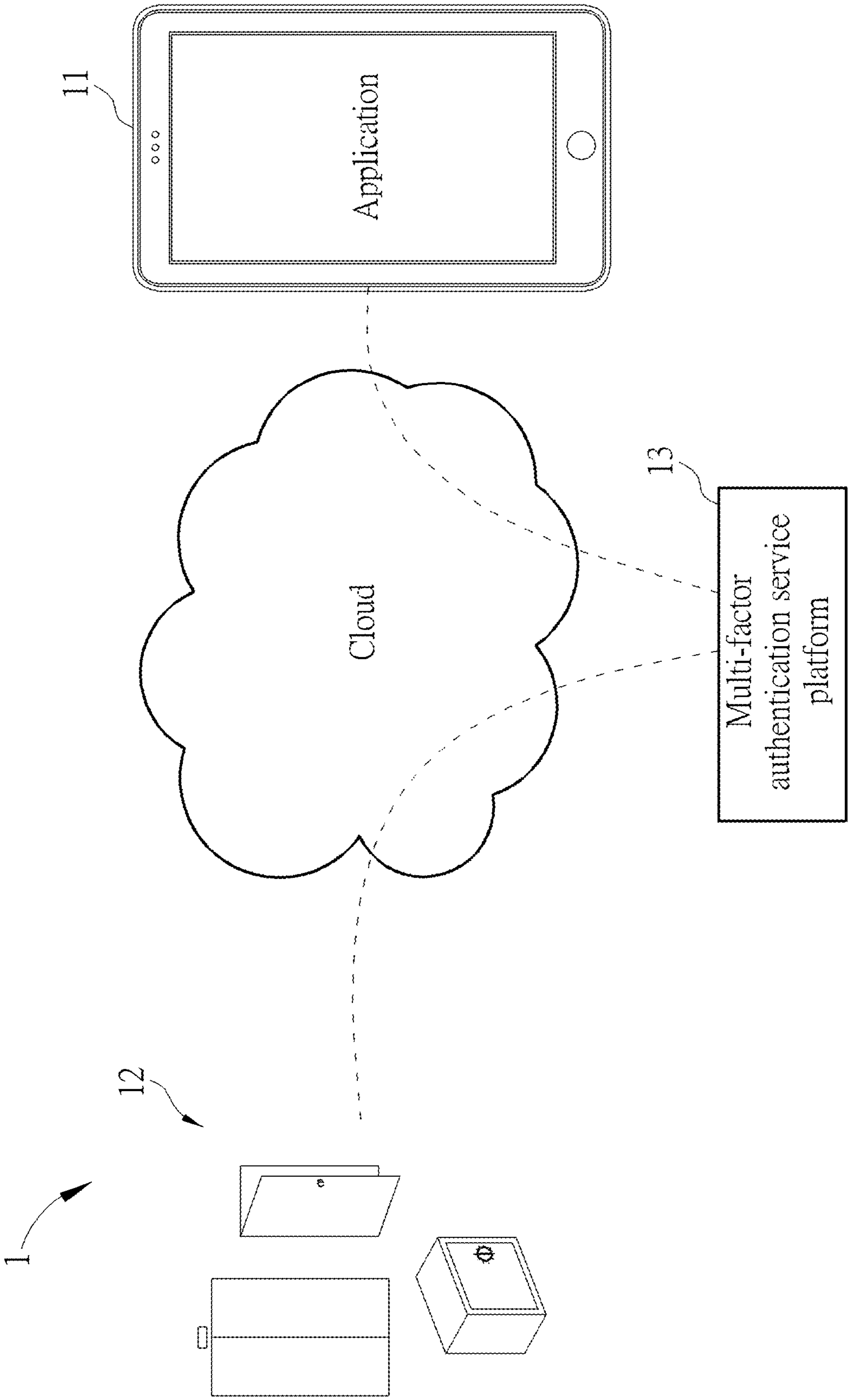
FIG. 1 is a schematic diagram of the multi-factor authentication system for property management.

The following descriptions of the embodiments illustrate implementations of the present invention, and those skilled in the art of the present invention can readily understand the advantages and effects of the present invention and/or apply the present invention to other embodiments in accordance with the contents herein. Therefore, any factors described in the present invention may be combined with any other factors disclosed in embodiments of the present invention.

The orders of drawings shown in accompanying drawings of this disclosure are only used to illustrate embodiments described herein, such that those with ordinary skill in the art can read and understand the present invention therefrom, of which are not intended to limit the scope of this disclosure. Any changes, modifications, or adjustments of said features, without affecting the designed purposes and effects of the present invention, should all fall within the scope of technical content of this disclosure.

As used herein, when describing an object "comprises," "includes" or "has" a limitation, unless otherwise specified, it may additionally encompass other elements, structures, apparatus, devices, systems, steps, connections, modules, units, etc., and should not exclude others. Further, unless otherwise specified, wordings in singular forms such as "a," "an" and "the" also pertain to plural forms, and wordings such as "or" and "and/or" may be used interchangeably.

As used herein, the terms "user," "entering/exiting personnel," "visitor" and the like may be used interchangeably.

As used herein, the terms "comprise," "include," "have," or any other variations thereof are intended to cover a non-exclusive inclusion. For example, an apparatus, device, module, unit, process or system that comprises a list of elements is not necessarily limited to only those elements, but may include other elements not expressly listed, or inherent to such apparatus, device, module, unit, process or system.

As used herein, the phrase "at least one," in reference to a list of one or more elements, should be understood to mean at least one element selected from any one or more of the elements in the list of elements, but not necessarily including at least one of each and every element listed within the list of elements and not excluding any combinations of elements in the list of elements. This definition also allows that elements may optionally be present other than the elements identified within the list of elements to which the phrase "at least one" refers, whether related or unrelated to those elements identified. Thus, as a non-limiting example, "at least one of A and B" (or, equivalently, "at least one of A or B," or, equivalently, "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements).

As used herein, the term "authentication" may be interchangeable with likes of "confirm," "authorization," "judgment," "determination," "examination," "evaluation," "ratify," "verification," and "inspection." During an event to authenticate a piece of message, data or command, phrases such as "data authentication," "authenticate command," "confirm data," or "confirm command" may be expressed.

As used herein, the terms "biometric" and "biometric technique" may be interchangeable.

As used herein, the element "property management apparatus" may refer to an elevator, a freight lift, a building entry/exit door, a security device, a safe, or the like, which is used to enable mobility, exist, entrance and/or security purposes.

As used herein, the element "property management station" may refer to a building with or without an elevator or a company for providing property management service.

As used herein, the element "user device" may refer to a smart phone having imaging functionalities, a tabloid computer having imaging functionalities, a laptop having imaging functionalities, or a wearable electrical device having imaging functionalities, of which the present invention is not limited thereto.

As used herein, the term "first authentication factor" may refer to a substantial identity recognition device, an access control card, an access control magnet buckle, or the like, of which the present invention is not limited thereto.

As used herein, the term "second authentication factor" may refer to user name, user identifier (user ID), a user password, a card number for access control card, a card number for access control magnet buckle, or the like, of which the present invention is not limited thereto.

As used herein, the term "user metadata" may refer to user identifier, user biometric feature transformed into a specific vector data, field identifier, apparatus identifier and/or device identifier, of which the present invention is not limited thereto.

As used herein, the term "first biometric data" may refer to biology characteristics of a user obtained during an enrollment phase of with the multi-factor authentication system for property management, and may include facial visual trait of the user, voice trait of the user, fingerprint trait of the user, retinal trait of the user, vein distribution trait on finger of the user or the like, of which the present invention is not limited thereto.

As used herein, the term "second biometric data" may refer to biology characteristics of the user obtained during authentication phase of the multi-factor authentication system for property management, such as the biometric characteristics obtained through biometric device in the property management apparatus (such as, but not limited to, an elevator) while the user is in the property management apparatus. The biometric characteristics may include, but not limited to, facial visual trait of the user, voice trait of the user, fingerprint trait of the user, retinal trait of the user, vein distribution trait on finger of the user, or the like.

A multi-factor authentication system for property management is provided for a user (such as, but not limited to, an entry/exit personnel of a building for operating property management). The user may enroll in service for multi-factor authentication via an application (such as, but not limited to, the application installed on the user device), thereby to acquire property management service in convenience and secure manner. The user may obtain account (such as, but not limited to, entry/exit personnel authorization for property management station) and user authority via logging in at the enrollment phase for the multi-factor authentication service platform, thereby to access service of the multi-factor authentication service platform via property management station system. Additionally, the authentication phase of the multi-factor authentication service platform may enable access to property management service for the user in fewer steps, in more secure manner, and with enforced security for identification during the property management service.

In at least one embodiment, the user device further includes a user device connection unit coupled to the first data processing unit and the user device display and may be used to provide internet connection for transmitting the first biometric data.

In at least one embodiment, the first biometric data may be biology characteristics of the user obtained during enrollment phase with the multi-factor authentication system.

In at least one embodiment, the property management apparatus may include: a second data processing unit and a property management apparatus connection unit. The second data processing unit may be used to receive and process the first authentication factor from the user, generate a first-authentication-factor-authentication-successful instruction, and transmit the first-authentication-factor-authentication-successful instruction. The second data processing unit may be also used to receive and transmit the second authentication factor from the user. The property management apparatus connection unit may be coupled to the second data processing unit and may be used to provide internet connection for transmitting the first-authentication-factor-authentication-successful instruction and the second authentication factor.

In at least one embodiment, the cloud property management station server apparatus may include: a third data processing unit, an authentication unit and a cloud property management station server apparatus connection unit. The third data processing unit may be used to receive and transmit the first biometric data from the user device. The third data processing unit may also be used to receive the biometric feature, the user-authentication-successful instruction and the user metadata from the cloud biometric server apparatus and transmit the biometric feature and the user metadata. The third data processing unit may also be used to receive the first-authentication-factor-authentication-successful instruction from the property management apparatus. The third data processing unit may also be used to receive and transmit the second authentication factor. The authentication unit may be coupled to the third data processing unit and may be used to acquire the second authentication factor and the user metadata, authenticate the user, generate a second-authentication-factor-authentication-successful instruction and a property-management instruction and transmit the property-management instruction. The cloud property management station server apparatus connection unit may be coupled to the authentication unit and may be used to provide internet connection for transmitting the biometric feature, the second-authentication-factor-authentication-successful instruction and the property-management instruction.

In at least one embodiment, the cloud property management station server apparatus may further include a database. The cloud property management station server apparatus may be coupled to the cloud property management station server apparatus connection unit and may be used to store the biometric feature.

In at least one embodiment, the biometric device may include a biometric data extraction unit and a biometric device connection unit. The biometric data extraction unit may be used to extract second biometric data from the user. The biometric device connection unit may be coupled to the biometric data extraction unit and may be used to provide internet connection for transmitting the second biometric data.

In at least one embodiment, the second biometric data may be biology characteristics of the user obtained during authentication phase with the multi-factor authentication system.

In at least one embodiment, the cloud biometric server apparatus may include a fourth data processing unit with a property management pool and a cloud biometric server apparatus connection unit. The fourth data processing unit with the property management pool may be used to receive the first biometric data from the cloud property management station server apparatus, generate and transmit the biometric feature from the first biometric data, receive the second-authentication-factor-authentication-successful instruction from the cloud property management station server apparatus, receive and authenticate the second biometric data from the biometric device to generate and transmit the user-authentication-successful instruction and the user metadata. The user metadata may be stored in the property management pool for a predetermined period of time. The cloud biometric server apparatus connection unit may be coupled with the fourth data processing unit and may be used to provide internet connection for transmitting the user-authentication-successful instruction and the user metadata.

In at least one embodiment, the predetermined period of time may be between 5 minutes and 20 minutes.

FIG. 1 is a schematic diagram of the multi-factor authentication system 1 for property management, including a user device 11, an application executed by the user device 11, a property management station system 12 and a multi-factor authentication service platform 13. The user device 11, the property management station system 12 and the multi-factor authentication service platform 13 may be connected with each other via any suitable wired or wireless manner.

In some embodiments, the multi-factor authentication system 1 for property management may enable user to log in the application installed at the user device 11 during the enrollment phase, the application to transmit the first biometric data (such as, but not limited to facial image) acquired from the user, via the cloud property management station server apparatus 122 to the cloud biometric server apparatus 131 of the multi-factor authentication service platform 13 for transformation (such as but not limited to transforming the first biometric data into vector data), the cloud biometric server apparatus 131 to transmit the transformed first biometric data back to the property management station server apparatus 122, the property management station server apparatus 122 to store the transformed first biometric data in the database 1224, and the user to perform the subsequent identity authentication using the property management service provided by the property management system 12.

Figure 2:
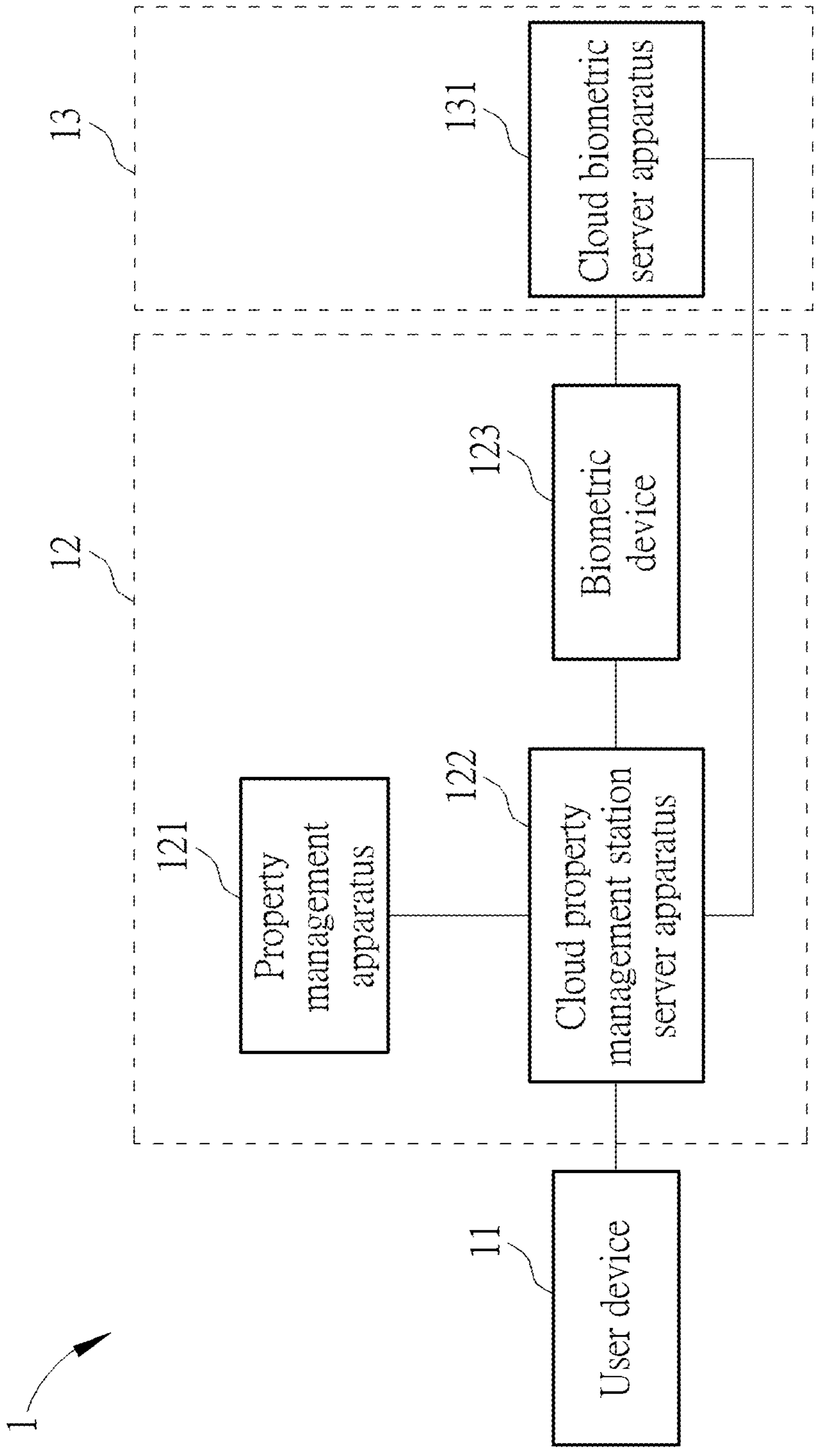
FIG. 2 is a schematic diagram of the multi-factor authentication system for property management.

FIG. 2 is a schematic diagram of the multi-factor authentication system 1 for property management, including a user device 11, an property management apparatus 121, a cloud property management station server apparatus 122, a biometric device 123 and a cloud biometric server apparatus 131. The elements of the multi-factor authentication system 1 for property management may be connected with each other via any suitable wired or wireless manner.

In some embodiments, the user device 11 may be used to process the first biometric data to complete enrollment phase with the multi-factor authentication system 1 for property management. The user device 11 may be realized as a smartphone with camera lens, a tabloid computer with camera lens, a notebook computer with camera lens, or a wearable electronic device with camera lens. In some embodiments, the user device 11 may be disposed with the application corresponding to the multi-factor authentication system 1 for property management. The user may initiate the camera functionality of the user device 11 and acquire the biometric characteristics of the user during the enrollment phase.

In some embodiments, the property management apparatus 121 may be used to receive the first authentication factor and the second authentication factor from the user and provide property management service. The property management apparatus 121 may be realized as an elevator, a freight lift, a building entry/exit door, a security device, a safe, or the like.

In some embodiments, the cloud property management station server apparatus 122 may be used to receive and transmit the first biometric data from the user device 11, process the second authentication factor from the property management apparatus 121.

In some embodiments, the biometric device 123 may be used to acquire and transmit the second biometric data from the user to complete the authentication phase with the multi-factor authentication system 1 for property management. The biometric device 123 may be realized as a facial recognition device, a fingerprint recognition device, a finger vein distribution recognition device, a voice recognition device, a retinal recognition device, a palm print recognition device and/or a blood vessel recognition device.

In some embodiments, the cloud biometric server apparatus 131 may be used to process the first biometric data form the cloud property management station server apparatus 122 and the second biometric data from the biometric device 123, and generate the user-authentication-successful instruction, and transmit the user-authentication-successful instruction and the user metadata to the cloud property management station server apparatus 122.

Figure 3:
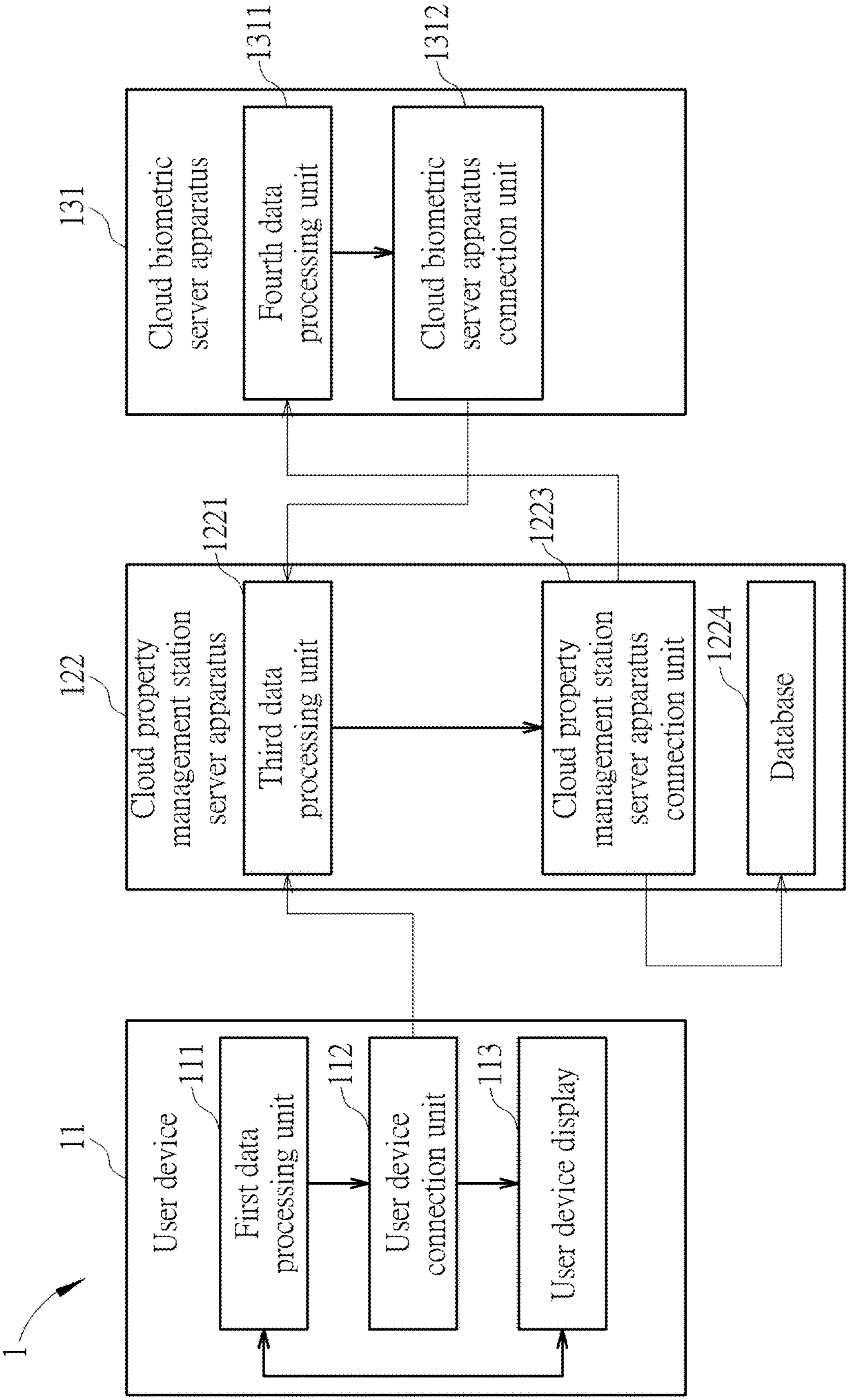
FIG. 3 is a schematic diagram of communication relationship (indicated by arrows) between elements and compositions of the elements of the multi-factor authentication system for property management.

FIG. 3 is a schematic diagram of communication relationship (indicated by arrows) between elements and compositions of the elements of the multi-factor authentication system 1 for property management.

In some embodiments, the user device 11 includes the first data processing unit 111, the user device connection unit 112 and the user device display 113.

In some embodiments, the first data processing unit 111 may be used to extract the first biometric data, and transmit the first biometric data to the cloud property management station server apparatus 122. The user device connection unit 112 may be an internet connection unit for providing point-to-point internet connection, and may be used to transmit the first biometric data. The user device display 113 may be used to display the first biometric data for confirmation by the user upon generation.

In some embodiments, the cloud property management station server apparatus 122 includes a third data processing unit 1221 and a cloud property management station server apparatus connection unit 1223.

In some embodiments, the cloud property management station server apparatus 122 further includes a database 1224 for storing biometric features. The biometric features may be used to establish property management membership file folder for the user. The database 1224 may be realized as any suitable data storage device, system, cloud storage space or the like, and the present invention is not limited thereto.

In some embodiments, the cloud biometric server apparatus 131 includes a fourth data processing unit 1311 and a cloud biometric server apparatus connection unit 1312.

In some embodiments, the third data processing unit 1221 of the cloud property management station server apparatus 122 may be used to receive and transmit the first biometric data from the user, via the cloud property management station server apparatus connection unit 1223, to the cloud biometric server apparatus 131. The fourth data processing unit 1311 of the cloud biometric server apparatus 131 may be used to receive the first biometric data, generate the biometric feature from the first biometric data, and transmit the biometric feature to the cloud biometric server apparatus connection unit 1312. The cloud biometric server apparatus connection unit 1312 may be an internet connection unit for providing point-to-point internet connection and transmitting the biometric feature to the third data processing unit 1221 of the cloud property management station server apparatus 122. The third data processing unit 1221 may be used to receive and transmit the biometric feature, via the cloud property management station server apparatus connection unit 1223, to the database 1224 for storage.

Figure 4:
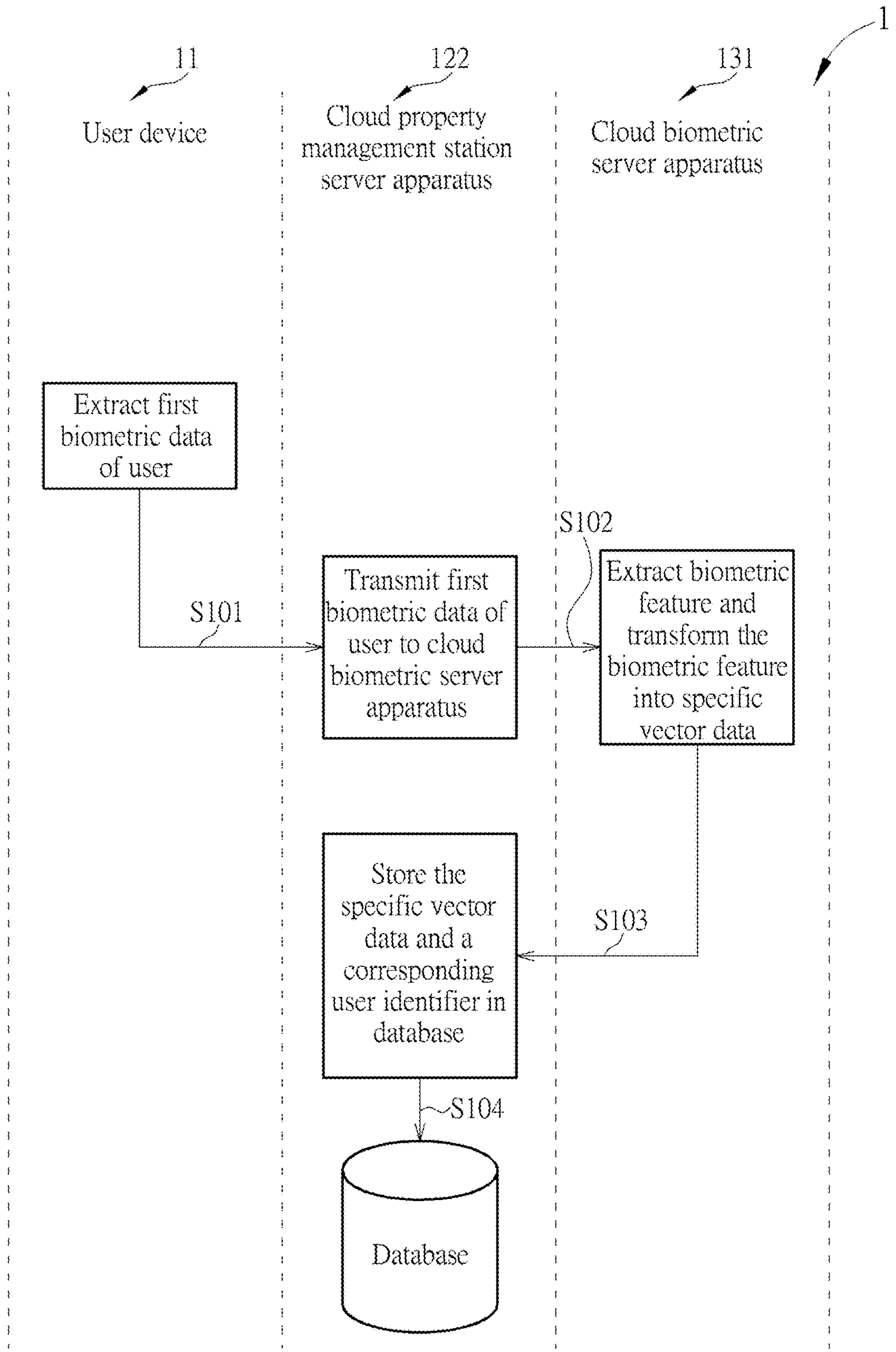
FIG. 4 is schematic diagram of implementation process for enrollment phase with the multi-factor authentication system for property management, where the arrows are shown to depict the steps for the implementation process.

FIG. 4 is schematic diagram of implementation process for enrollment phase with the multi-factor authentication system 1 for property management, where the arrows are shown to depict the steps for the implementation process.

In some embodiments, the application executed on the user device 11 may enable log in by the user and extract and provide the first biometric data of the user, via the cloud property management station server apparatus 122, to the cloud biometric server apparatus 131 of the multi-factor authentication service platform 13. The cloud biometric server apparatus 131 may be used to transform and transmit the first biometric data to the cloud property management station server apparatus 122. The cloud property management station server apparatus 122 may be used to store the transformed first biometric data in the database 1224. For example, the user device 11 may utilize a photo-shoot interface of the application to acquire the first biometric data (such as, but not limited to, facial image) of the user. The application may transmit the first biometric data of the user to the cloud property management station server apparatus 122 (Step S101). The cloud property management station server apparatus 122 may transmit the first biometric data to the cloud biometric server apparatus 131 (Step S102). The cloud biometric server apparatus 131 may extract the biometric feature of the first biometric data, transform the biometric feature into a specific vector data and transmit the specific vector data to the cloud property management station server apparatus 122 (Step S103). The cloud property management station server apparatus 122 may store the specific vector data and a corresponding user identifier (user ID) in the database 1224 in a vector mode (Step S104). For example, during a subsequent identity authentication phase, a vector data point may be determined or extracted from the database 1224 quickly to execute identity authentication.

In some embodiments, the database 1224 may be a vector database, and may be used to provide user identifier management, first biometric data management, second biometric data management, identity authentication, data access management and data search (such as, but not limited to, search engine), of which the present invention is not limited thereto.

In some embodiments, before the first biometric data is transmitted by the cloud property management station server apparatus 122 to the cloud biometric server apparatus 131 and/or after the specific vector data is transmitted to the cloud property management station server apparatus 122, the cloud biometric server apparatus 131 of the multi-factor service platform 13 will not store the specific vector data transformed from the biometric feature.

Figure 5:
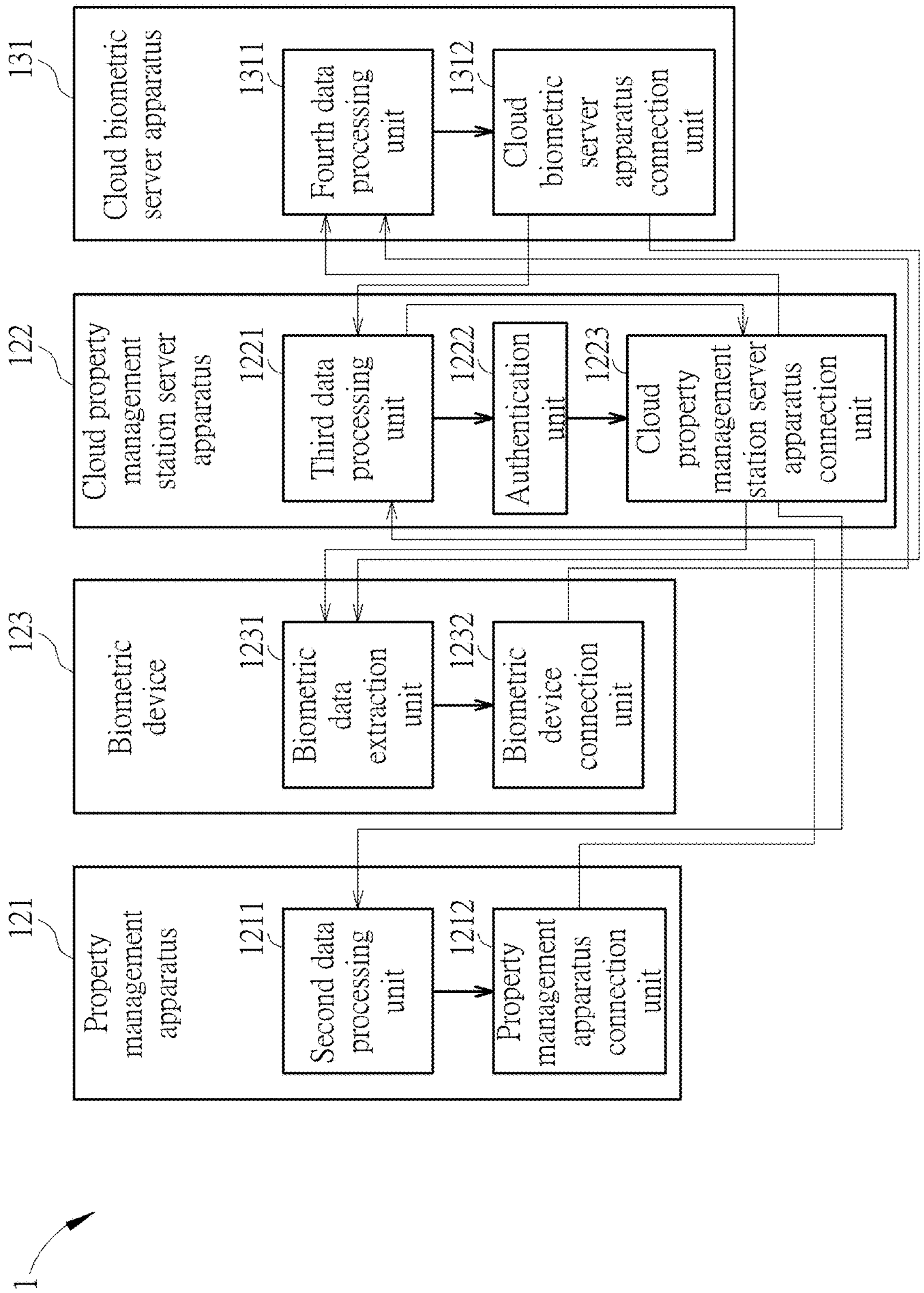
FIG. 5 is a schematic diagram of communication relationship (indicated by arrows) between elements and compositions of the elements of the multi-factor authentication system for property management.
Figure 6A:
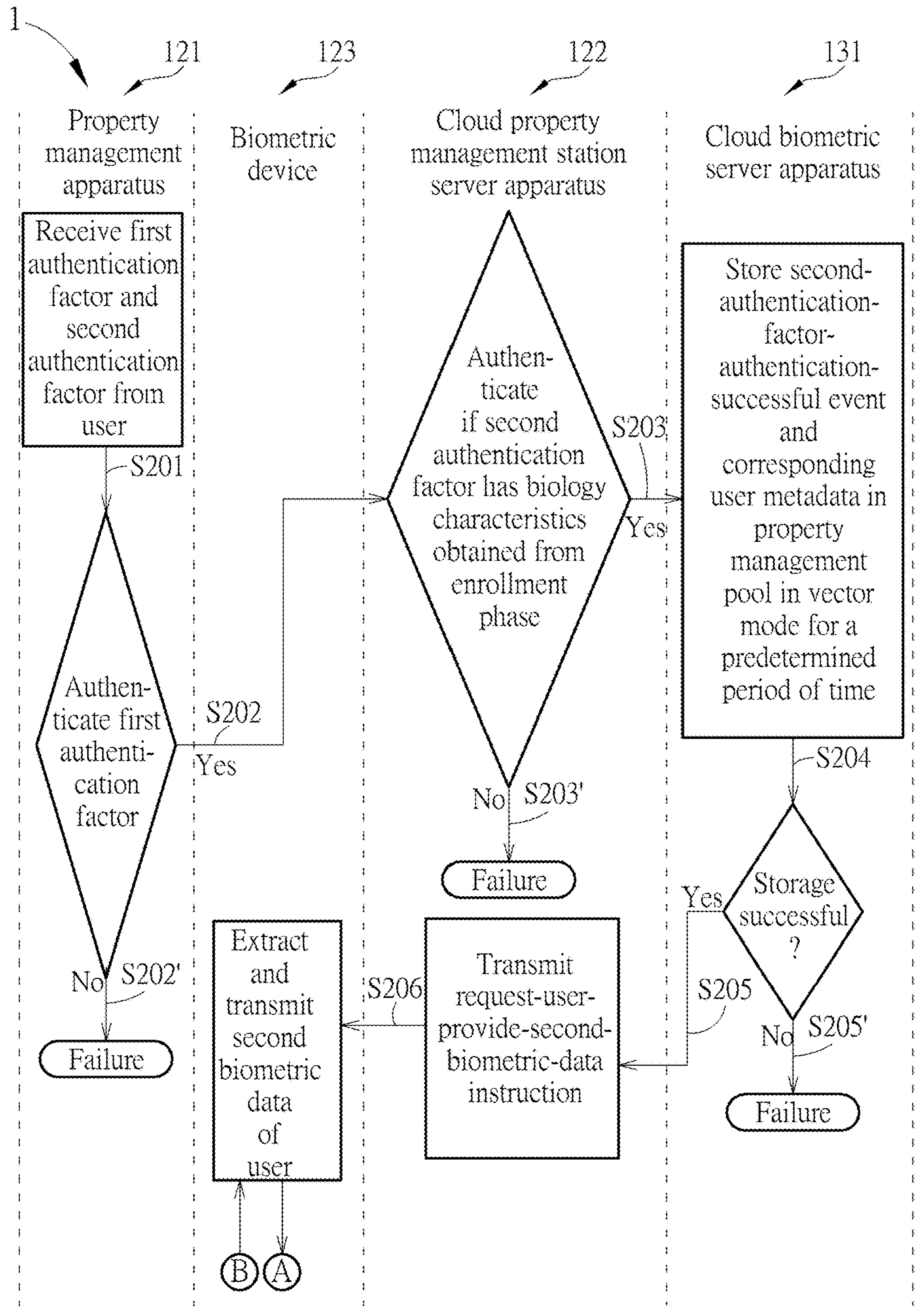
FIG. 6A is a schematic diagram of implementation process for authentication phase with the multi-factor authentication system for property management.
Figure 6B:
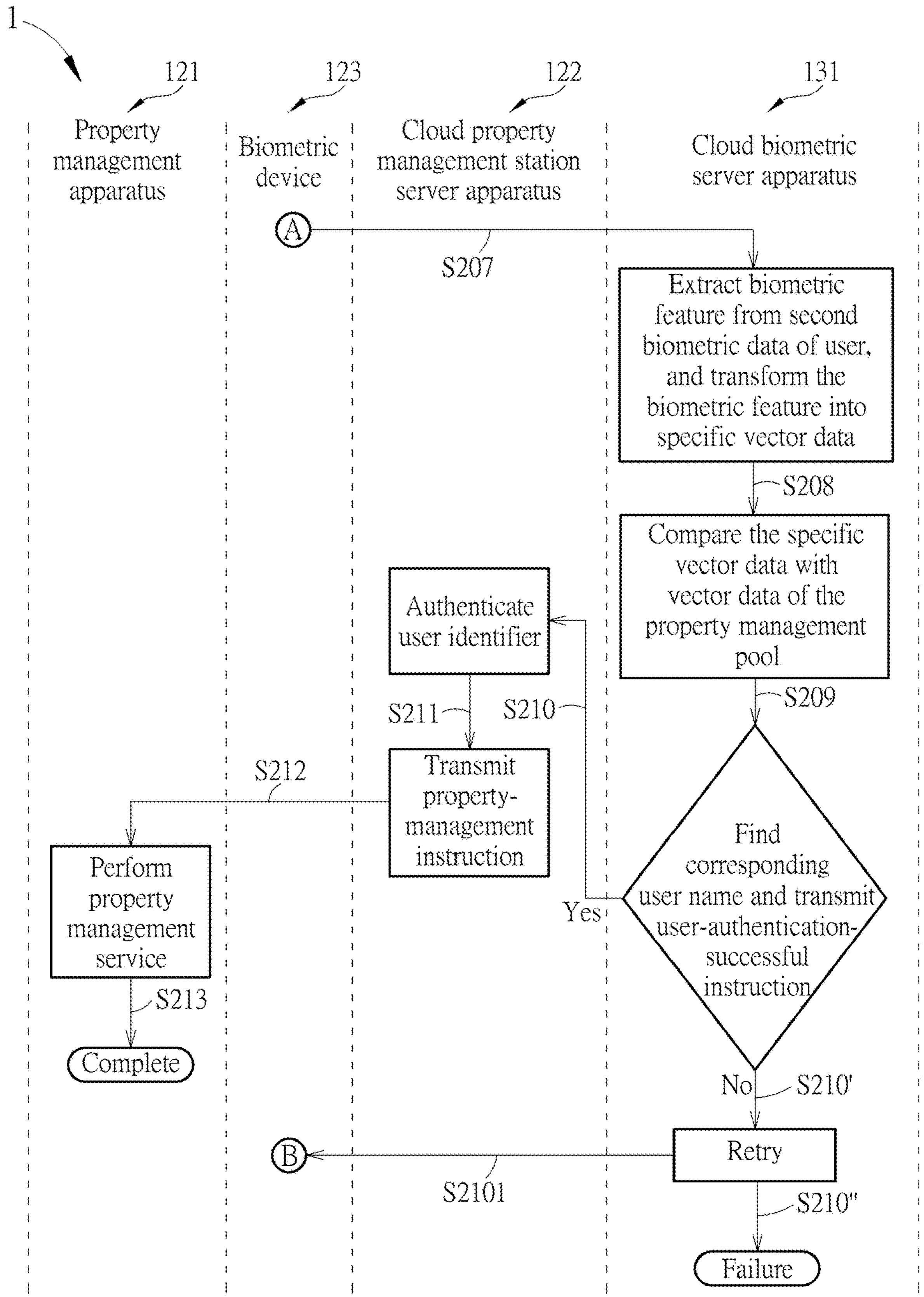
FIG. 6B is a schematic diagram of implementation process for authentication phase with the multi-factor authentication system for property management.

FIG. 5 is a schematic diagram of communication relationship (indicated by arrows) between elements and compositions of the elements of the multi-factor authentication system 1 for property management. FIG. 6A and FIG. 6B is a schematic diagram of implementation process for authentication phase with the multi-factor authentication system 1 for property management, where the arrows are shown to depict the steps for the implementation process.

In some embodiments, the property management apparatus 121 includes a second data processing unit 1211 and a property management apparatus connection unit 1212.

In some embodiments, the cloud property management station server apparatus 122 may include a third data processing unit 1221, an authentication unit 1222 and a cloud property management station server apparatus connection unit 1223.

In some embodiments, the cloud biometric server apparatus 131 may include a fourth data processing unit 1311 and a cloud biometric server apparatus connection unit 1312.

In some embodiments, the biometric device 123 may include a biometric data extraction unit 1231 and a biometric device connection unit 1232.

In some embodiments, the second data processing unit 1211 (such as, but not limited to, card reader and/or access control management unit) of the property management apparatus 121 (such as, but not limited to, elevator) may receive and process the first authentication factor from the user (such as, but not limited to, a substantial identity recognition device, an access control card or an access control magnet buckle) (Step S201), generate and transmit the first-authentication-factor-authentication-successful instruction (Step S202), and receive and transmit the second authentication factor from the user (user name, user identifier (user ID), a user password, a card number for access control card and/or a card number for access control magnet buckle) (Step S202).

For example, the user may place the access control card on the card reader after entering the elevator. The card reader may transmit the card number for access control card to the access control management unit and confirm validity with the database within the access control management unit (S201). If the card number is present within the database of the property management unit, the property management unit may generate the first-authentication-factor-authentication-successful instruction and transmit, via the property management apparatus connection unit 1212, the first-authentication-factor-authentication-successful instruction and the second authentication factor (Step S202). If card number is not present within the database of the property management unit, the property management unit may generate and transmit the first-authentication-factor-authentication-unsuccessful instruction to the card reader (Step S202'), and the display unit of the card reader may display "failure" accordingly.

In some embodiments, the third data processing unit 1221 of the cloud property management station server apparatus 122 may receive the first-authentication-factor-authentication-successful instruction and the second authentication factor from the property management apparatus 121 and transmit the second authentication factor to the authentication unit 1222. The authentication unit 1222 may authenticate the second authentication factor, generate a second-authentication-factor-authentication-successful instruction and a property-management instruction, and transmit the property-management instruction to the cloud property management station server apparatus connection unit 1223.

For example, the third data processing unit 1221 of the cloud property management station server apparatus 122 may receive and transmit the first authentication factor (such as, but not limited to, user name, user identifier, user password, card number for access control card and/or card number for access control magnet bucket) to the authentication unit 1222. The authentication unit 1222 may authenticate if the user has the biology characteristics obtained from the enrollment phase according to the second authentication factor. If authentication is successful, the authentication unit 1222 may generate the second-authentication-factor-authentication-successful instruction and a second-authentication-factor-authentication-successful event and transmit the second-authentication-factor-authentication-successful instruction, the second-authentication-factor-authentication-successful event, and the second authentication factor to the cloud biometric server apparatus 131 (Step S203). If authentication is unsuccessful, the authentication unit 1222 may generate a second-authentication-factor-authentication-unsuccessful instruction. The fourth data processing unit 1311 with the property management pool of the cloud biometric server apparatus 131 may receive the second-authentication-factor-authentication-successful instruction, the second-authentication-factor-authentication-successful event, and the second authentication factor and store the second-authentication-factor-authentication-successful event, the second authentication factor, and the corresponding user metadata (such as, but not limited to, user identifier, the specific vector data transformed from the biometric feature of the user, field identifier, apparatus identifier and/or device identifier) in the property pool in vector mode for a predetermined period of time (Step S204). The property management pool may be used to extract, transform or read the user metadata. If storage of the second-authentication-factor-authentication-successful event, the second authentication factor, and the corresponding user metadata is successful, the fourth data processing unit 1311 with the property management pool of the cloud biometric server apparatus 131 may generate a storage-successful instruction (Step S205), and transmit the storage-successful instruction, via the cloud biometric server apparatus connection unit 1312, to the cloud property management station server apparatus 122. If storage of the second-authentication-factor-authentication-successful event, the second authentication factor, and the corresponding user metadata is unsuccessful, the fourth data processing unit 1311 with the property management pool of the cloud biometric server apparatus 131 may generate a storage-unsuccessful instruction (Step S205').

In some embodiments, the term "predetermined period of time" may be set and adjusted according to requirements of the multi-factor authentication service platform. For example, the predetermined period of time may be between 1 minute and 2 minutes, 1 minute and 15 minutes, 1 minute and 10 minutes, 1 minute and 5 minutes, 1 minute and 2 minutes, 2 minutes and 20 minutes, 2 minutes and 15 minutes, 2 minutes and 10 minutes, 2 minutes and 5 minutes, 5 minutes and 20 minutes, 5 minutes and 15 minutes, 5 minutes and 10 minutes, 10 minutes and 20 minutes, 10 minutes and 15 minutes or 15 minutes and 20 minutes, but the present invention is not limited thereto.

In some embodiments, the third data processing unit 1221 of the cloud property management station server apparatus 122 may receive the storage-successful instruction, generate a request-user-provide-second-biometric-data instruction, and transmit the request-user-provide-second-biometric-data instruction, via the cloud property management station server apparatus connection unit 1223 to the biometric device 123 (Step S206).

In some embodiments, the biometric data extraction unit 1231 of the biometric device 123 (such as, but not limited to, a facial recognition device, a fingerprint recognition device, a finger vein distribution recognition device, a voice recognition device, a retinal recognition device, a palm print recognition device and/or a blood vessel recognition device) may be a camera or a monitor and may be used to receive the request-user-provide-second-biometric-data instruction from the cloud property management station server apparatus 122, extract the second biometric data (such as, but not limited to, facial image of the user obtained from facial recognition device of in the elevator) of the user according to the request-user-provide-second-biometric-data instruction, transmit the second biometric data, via the biometric device connection unit 1232, to the cloud biometric server apparatus 131 (Step S207).

In some embodiments, the fourth data processing unit 1311 with the property management pool of the cloud biometric server apparatus 131 may receive the second biometric data, extract and transform the biometric feature of the second biometric data into a specific vector data (Step S208), and compare the specific vector data with the data of the property management pool to look up user data (such as, but not limited to, user name) corresponding to the biometric feature Step S209). If look up for the corresponding user data is successful, the fourth data processing unit 1311 with the property pool may generate a request-user-identifier-authentication instruction and transmit the request-user-identifier-authentication instruction and the user metadata, via the cloud biometric server apparatus connection unit 1312, to the cloud property management station server apparatus 122 (Step S210). If look up for the corresponding user data is unsuccessful, a retry attempt may be conducted (Step S210'). When the retry attempt is failed, the fourth data processing unit 1311 with the property pool may generate a look-up-unsuccessful instruction (i.e., the user may not operate the property management service) (Step S210") or request the biometric device 123 to extract the second biometric data from the user again (such as, but not limited to, have the facial image of the user photographed once again) (Step S2101). The third data processing unit 1221 of the cloud property management station server apparatus 122 may receive the request-user-identifier-authentication instruction and the user metadata and transmit the user metadata to the authentication unit 1222 for authentication of user identifier (Step S211). For example, the user metadata may be compared with user identifier stored in the database 1224 (such as, but not limited to, vector database). If a corresponding user identifier for the user metadata is present, the authentication unit 1222 may complete the authentication process and generate a property-management instruction (Step S212) and transmit the property-management instruction, via the cloud property management station server apparatus connection unit 1223 to the property management apparatus 121. The second data processing unit 1211 of the property management apparatus 121 may receive the property-management instruction and unlock the property management apparatus 121 (e.g., the user may be enabled to select various floor bottoms for the elevator) to provide property management service for the user (Step S213).

In some embodiments, before transmitting the second-authentication-factor-authentication-successful event, the second authentication factor, and the second authentication factor to the cloud biometric server apparatus 131 and/or storing the second-authentication-factor-authentication-successful event, the second authentication factor, and the corresponding user metadata in the property management pool in vector mode for the predetermined period of time set by the multi-factor authentication service platform 13, the cloud biometric server apparatus 131 of the multi-factor authentication service platform 13 may not store the second authentication factor and the corresponding user metadata. Before transmitting the second biometric data, via the biometric device connection unit 1232, to the cloud biometric server apparatus 131 and/or after the fourth data processing unit 1311 with the property management pool generating the request-user-identifier-authentication instruction and transmitting the request-user-identifier-authentication instruction and the user metadata, via the cloud biometric server apparatus connection unit 1312, to the cloud property management station server apparatus 122, the cloud biometric server apparatus 131 of the multi-factor authentication service platform 13 may not store the specific vector data transformed from the second biometric data.

Each unit of FIG. 2, FIG. 3 and FIG. 5 may be realized as software, hardware, or firmware. If said unit is software or firmware, the unit may include command executable by a unit, processor, computer or server. If said unit is hardware, the unit may be a module, processor, computer, or server capable of data processing and computing.

In some embodiments, the elements of the multi-factor authentication system 1 for property management may be respectively realized as any suitable computing device, apparatus, application, system or the like, and the present invention is not limited thereto. In some embodiments, any two or three of the third data processing unit 1211, the authentication unit 1222 and the cloud property management station server apparatus connection unit 1223 of the cloud property management station server apparatus 122 may be integrated as one unit instead of being realized as three standalone units. However, without straying away from operational concepts described in the present invention, arrangements of the elements of the multi-factor authentication system 1 may be realized in any suitable formats and should not limit the present invention in any way.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A multi-factor authentication system for property management, comprising:

a user device comprising:

an application configured to process and transmit first biometric data;

a first data processing unit configured to extract and transmit the first biometric data; and a user device display coupled to the first data processing unit and configured to display the first biometric data;

a property management station system comprising:

a property management apparatus configured to receive a first authentication factor and a second authentication factor from a user, process the first authentication factor to generate first-authentication-factor-authentication-successful instruction, and transmit the first-authentication-factor-authentication-successful instruction and the second authentication factor; and a cloud property management station server apparatus coupled to the user device and the property management apparatus and configured to receive and transmit the first biometric data from the user device and process the first-authentication-factor-authentication-successful instruction and the second authentication factor from the property management apparatus; and a multi-factor authentication service platform comprising:

a cloud biometric server apparatus coupled to the cloud property management station server apparatus and the user device and configured to process the first biometric data from the cloud property management station server apparatus, extract biometric feature according to the first biometric data, process second biometric data from a biometric device, authenticate the second biometric data to generate a user-authentication-successful instruction and transmit the biometric feature, the user-authentication-successful instruction and user metadata;

wherein the cloud biometric server apparatus comprises:

a fourth data processing unit having a property management pool configured to receive the first and a biometric data second-authentication-factor-authentication-successful instruction from the cloud property management station server apparatus and the second biometric data from the biometric device, generate the biometric feature from the first biometric data, authenticate the second biometric data to generate the user-authentication-successful instruction and the user metadata, and transmit the biometric feature, the user-authentication-successful instruction and the user metadata; and a cloud biometric server apparatus connection unit coupled to the fourth data processing unit and configured to provide internet connection for transmitting the user-authentication-successful instruction and the user metadata, wherein the user metadata is stored in the property management pool for a predetermined period of time.

2. The multi-factor authentication system of claim 1, wherein the user device further comprises:

a user device connection unit coupled to the first data processing unit and the user device display and configured to provide internet connection for transmitting the first biometric data.

3. The multi-factor authentication system of claim 2, wherein the first biometric data is biology characteristics of the user obtained from enrollment phase with the multi-factor authentication system.

4. The multi-factor authentication system of claim 1, wherein the property management apparatus comprises:

a second data processing unit configured to receive and process the first authentication factor from the user to the generate first-authentication-factor-authentication-successful instruction, receive the second authentication factor from the user, and transmit the second authentication factor and the first-authentication-factor-authentication-successful instruction; and a property management apparatus connection unit coupled to the second data processing unit and configured to provide internet connection for transmitting the second authentication factor and the first-authentication-factor-authentication-successful instruction.

5. The multi-factor authentication system of claim 1, wherein the cloud property management station server apparatus comprises:

a third data processing unit configured to receive the first biometric data from the user device, the biometric feature, the user-authentication-successful instruction and the user metadata from the cloud biometric server apparatus, the first-authentication-factor-authentication-successful instruction from the property management apparatus, and second authentication factor from the property management apparatus, and transmit the first biometric data, the biometric feature, the user metadata, and the second authentication factor;

an authentication unit coupled to the third data processing unit and configured to acquire the second authentication factor and the user metadata to authenticate the user and generate the second-authentication-factor-authentication-successful instruction and a property-management-instruction, and transmit the property-management-instruction; and a cloud property management station server apparatus connection unit coupled to the authentication unit and configured to provide internet connection for transmitting the biometric feature, the second-authentication-factor-authentication-successful instruction and the property-management-instruction.

6. The multi-factor authentication system of claim 5, wherein the cloud property management station server apparatus further comprises:

a database coupled to the cloud property management station server apparatus connection unit and configured to store the biometric feature.

7. The multi-factor authentication system of claim 1, wherein the biometric device comprises:

a biometric data extraction unit configured to extract the second biometric data from the user; and a biometric device connection unit coupled to the biometric data extraction unit and configured to provide internet connection for transmitting the second biometric data.

8. The multi-factor authentication system of claim 7, wherein the second biometric data corresponds to biology characteristics of the user obtained during an authentication phase with the multi-factor authentication system.

9. The multi-factor authentication system of claim 1, wherein the predetermined period of time is between 5 minutes and 20 minutes.

* * * * *